(12) United States Patent
Cha

(10) Patent No.: US 10,078,972 B2
(45) Date of Patent: Sep. 18, 2018

(54) TWELVE-PIECE TANGRAM PUZZLE SET

(71) Applicant: Dong-sik Cha, Incheon (KR)

(72) Inventor: Dong-sik Cha, Incheon (KR)

( * ) Notice: Subject to any disclaimer, the term of this patent is extended or adjusted under 35 U.S.C. 154(b) by 241 days.

(21) Appl. No.: 15/078,329

(22) Filed: Mar. 23, 2016

(65) Prior Publication Data

US 2016/0284237 A1    Sep. 29, 2016

(30) Foreign Application Priority Data

Mar. 23, 2015  (KR) ......................... 10-2015-0039821

(51) Int. Cl.
| | | |
|---|---|---|
| *G09B 23/04* | (2006.01) | |
| *A63F 9/10* | (2006.01) | |
| *G09B 19/00* | (2006.01) | |
| *A63F 9/06* | (2006.01) | |

(52) U.S. Cl.
CPC .............. *G09B 23/04* (2013.01); *A63F 9/10* (2013.01); *G09B 19/00* (2013.01); *A63F 2009/0697* (2013.01)

(58) Field of Classification Search
USPC ............... 434/188, 191, 196, 208, 211, 212; 273/157 R
See application file for complete search history.

(56) References Cited

U.S. PATENT DOCUMENTS

| | | | | |
|---|---|---|---|---|
| 2,885,207 A | * | 5/1959 | Wormser ................. | A63F 9/10 273/157 R |
| 2,901,256 A | * | 8/1959 | Way ...................... | A63F 9/0669 273/157 R |
| 3,178,186 A | * | 4/1965 | Lee ........................ | A63F 9/10 273/157 R |
| 3,637,217 A | * | 1/1972 | Kent ...................... | A63F 9/12 273/157 R |
| 4,298,200 A | * | 11/1981 | Kanbar ................. | A63F 9/0669 273/148 A |
| 4,343,471 A | * | 8/1982 | Calvert ................ | A63F 9/0669 273/157 R |
| 4,365,809 A | * | 12/1982 | Barry ..................... | A63F 9/10 273/157 R |
| 4,913,436 A | * | 4/1990 | Li .......................... | A63F 9/10 273/157 R |

(Continued)

FOREIGN PATENT DOCUMENTS

| | | |
|---|---|---|
| KR | 2019980058271 | 10/1998 |
| KR | 2019990034705 | 9/1999 |

(Continued)

*Primary Examiner* — Kurt Fernstrom
(74) *Attorney, Agent, or Firm* — Susan Paik, Esq.

(57) ABSTRACT

A twelve-piece tangram puzzle set is disclosed. The twelve-piece tangram puzzle set includes twelve pieces, the twelve pieces being formed in such a manner that an equilateral triangle is formed as a basic frame and is bisected into right-angled triangles by a first cutting line, second cutting lines, horizontal cutting lines and vertical cutting lines, and equiangular cutting lines so as to be divided into respective pieces 1, 2, 3, 4, 5, 6, 7, 8, 9, 10, 11, 12, such that triangles (pieces 1, 3, 7, 9, 11) are symmetrical to triangles (pieces 2, 4, 8, 10, 12), and a trapezoidal quadrangle (piece 5) is symmetrical to a trapezoidal quadrangle (piece 6) based on the first cutting line.

5 Claims, 23 Drawing Sheets
(12 of 23 Drawing Sheet(s) Filed in Color)

(56) References Cited

U.S. PATENT DOCUMENTS

| | | | | |
|---|---|---|---|---|
| 5,108,291 | A * | 4/1992 | Kuo | G09B 23/02 273/157 R |
| 5,873,729 | A * | 2/1999 | Aghevli | G09B 1/40 273/157 R |
| 6,145,837 | A * | 11/2000 | Silvey | A63F 9/12 273/157 R |
| 6,357,747 | B1 * | 3/2002 | Kao | A63F 9/10 273/157 R |
| 9,443,440 | B2 * | 9/2016 | Moriyasu | A63F 9/0669 |
| 9,443,444 | B2 * | 9/2016 | Moriyasu | G09B 23/04 |
| 2006/0076732 | A1 * | 4/2006 | Chiou | A63F 9/10 273/153 R |
| 2009/0020947 | A1 * | 1/2009 | Albers | A63F 9/06 273/157 R |
| 2010/0194040 | A1 * | 8/2010 | Wood | A63F 9/08 273/156 |

FOREIGN PATENT DOCUMENTS

| | | |
|---|---|---|
| KR | 2019990041201 | 12/1999 |
| KR | 2002189390000 | 1/2001 |
| KR | 1004754830000 | 2/2005 |

\* cited by examiner

[Fig. 1]
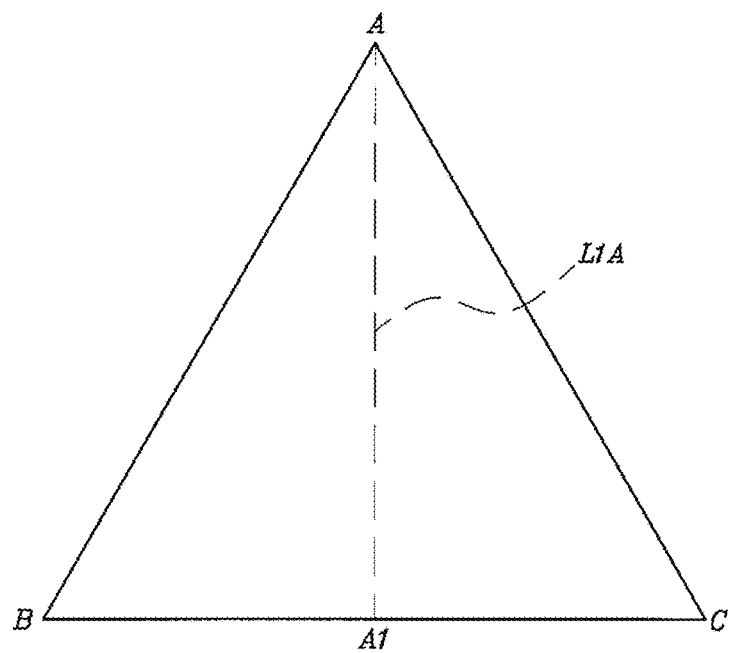
[Fig. 2]
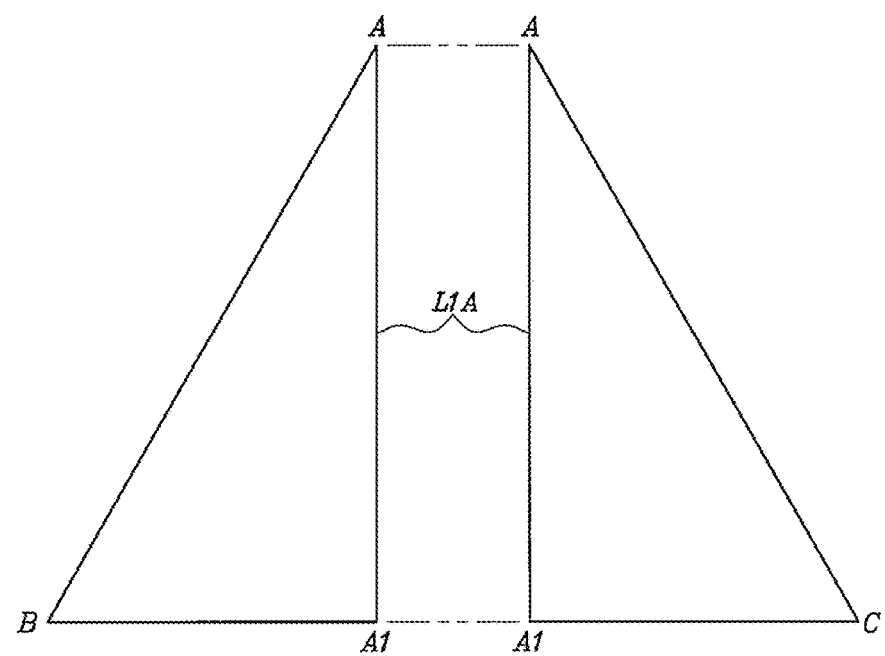

[Fig. 3]
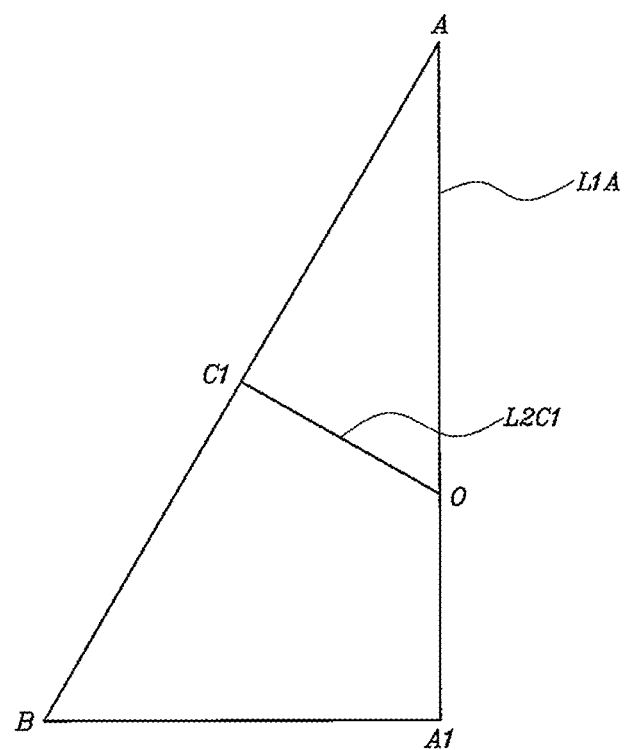

[Fig. 4]
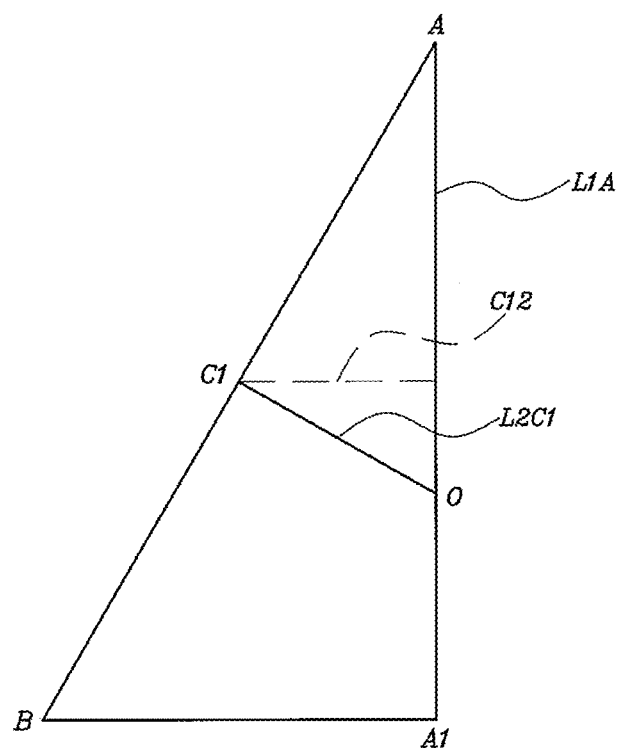

[Fig. 5]
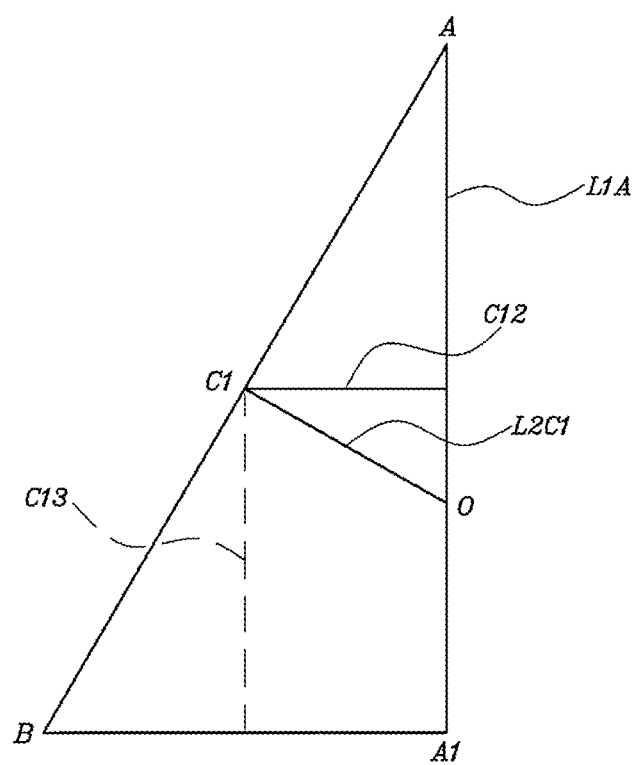

[Fig. 6]
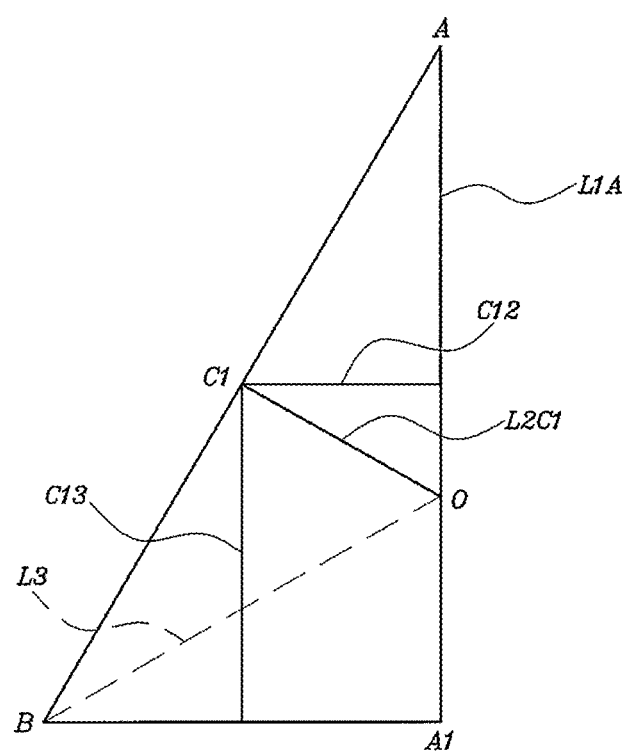

[Fig. 7]
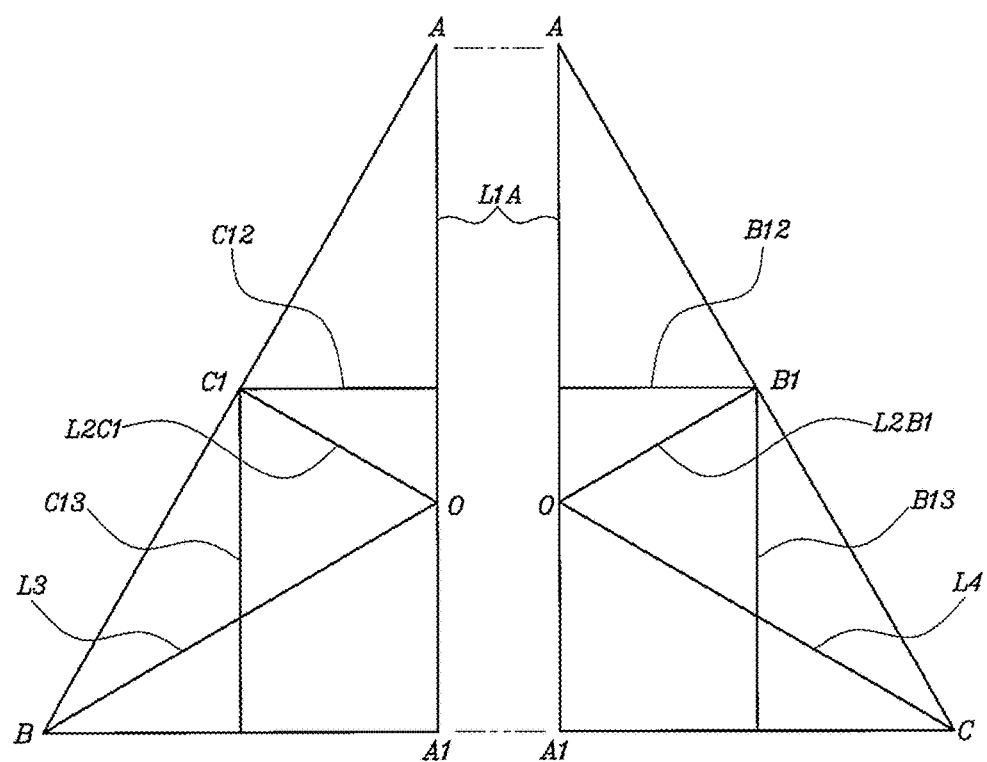

[Fig. 8]
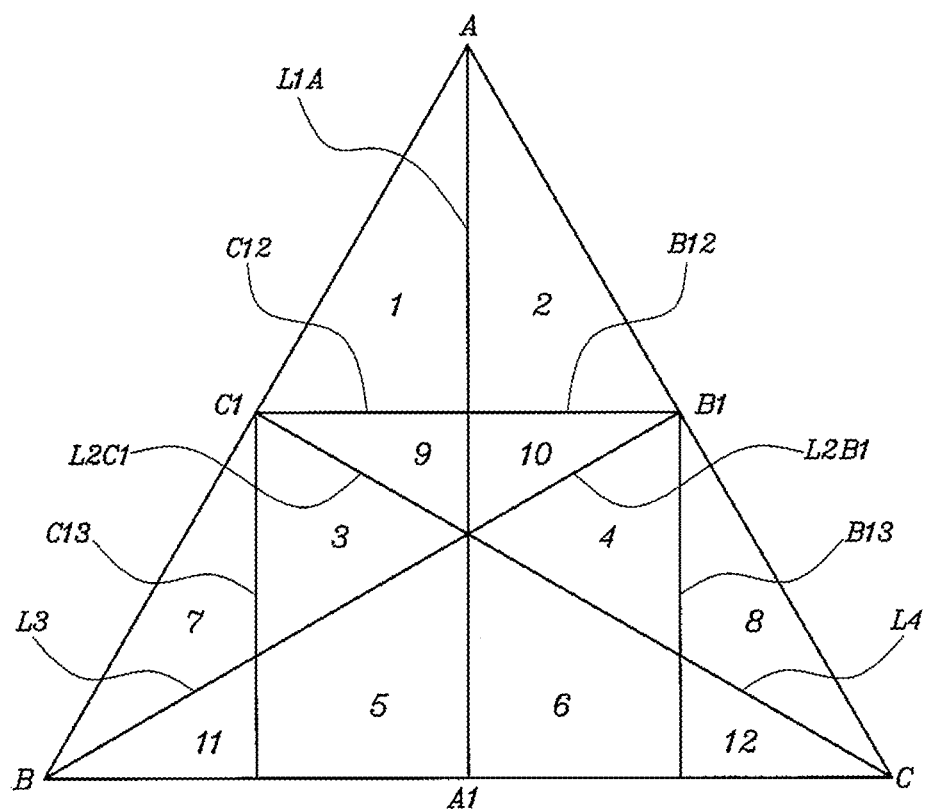

[Fig. 9]
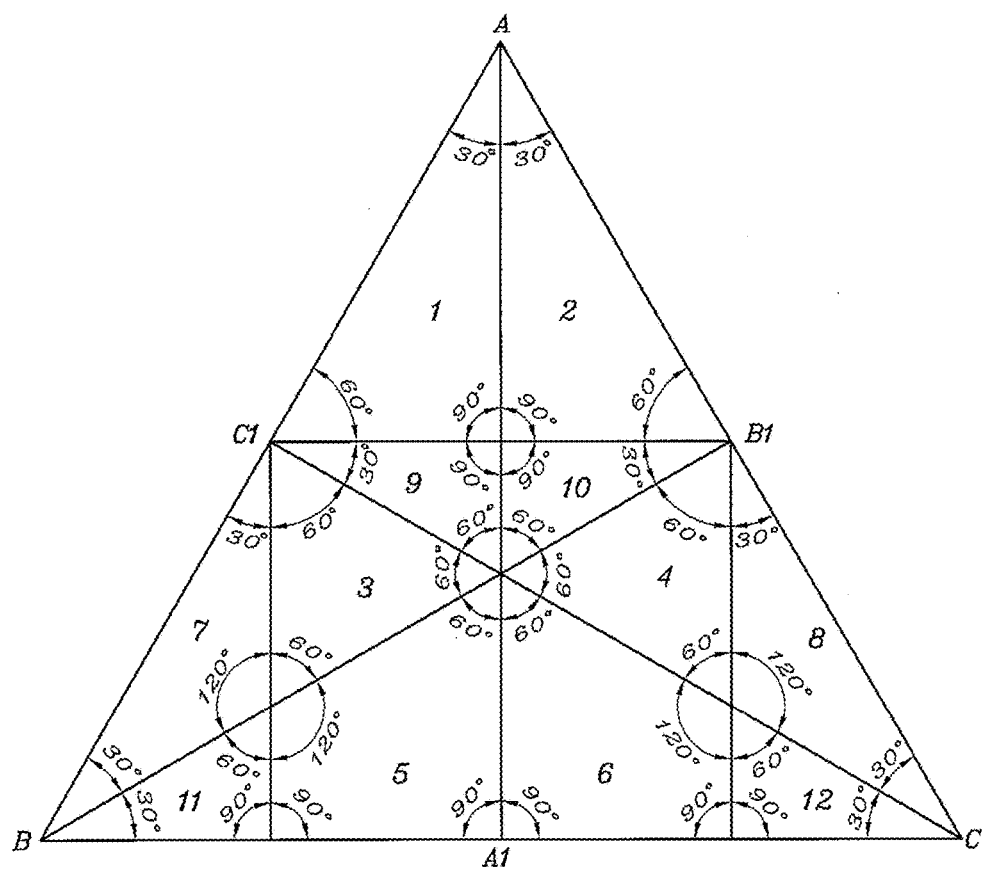

[Fig. 10]
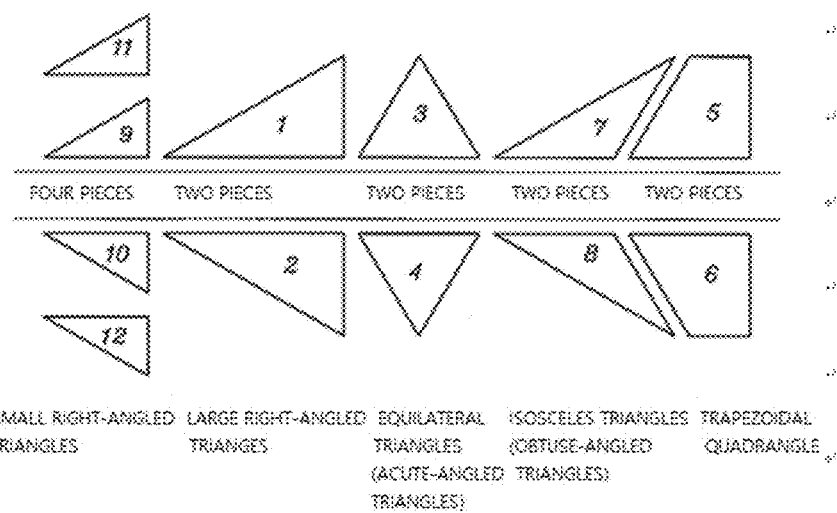

[Fig. 1 1]
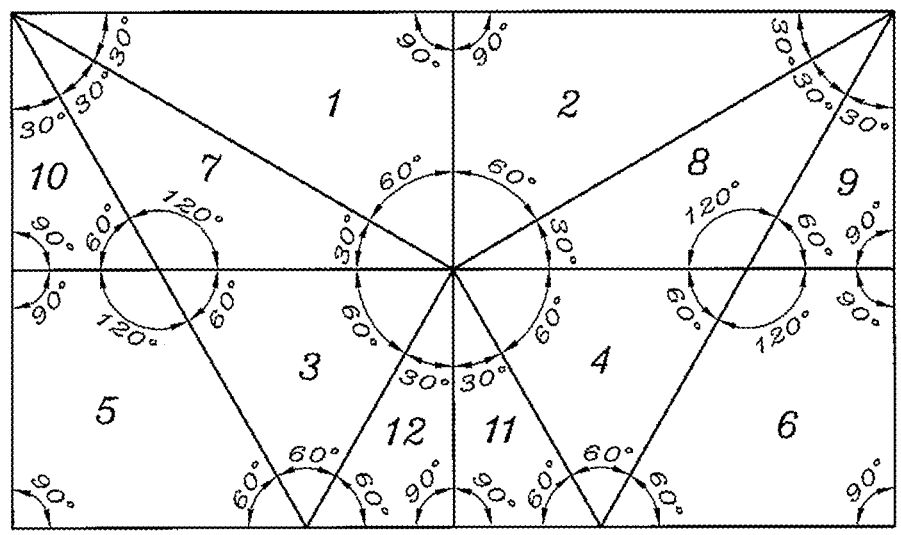

[Fig. 1 2]
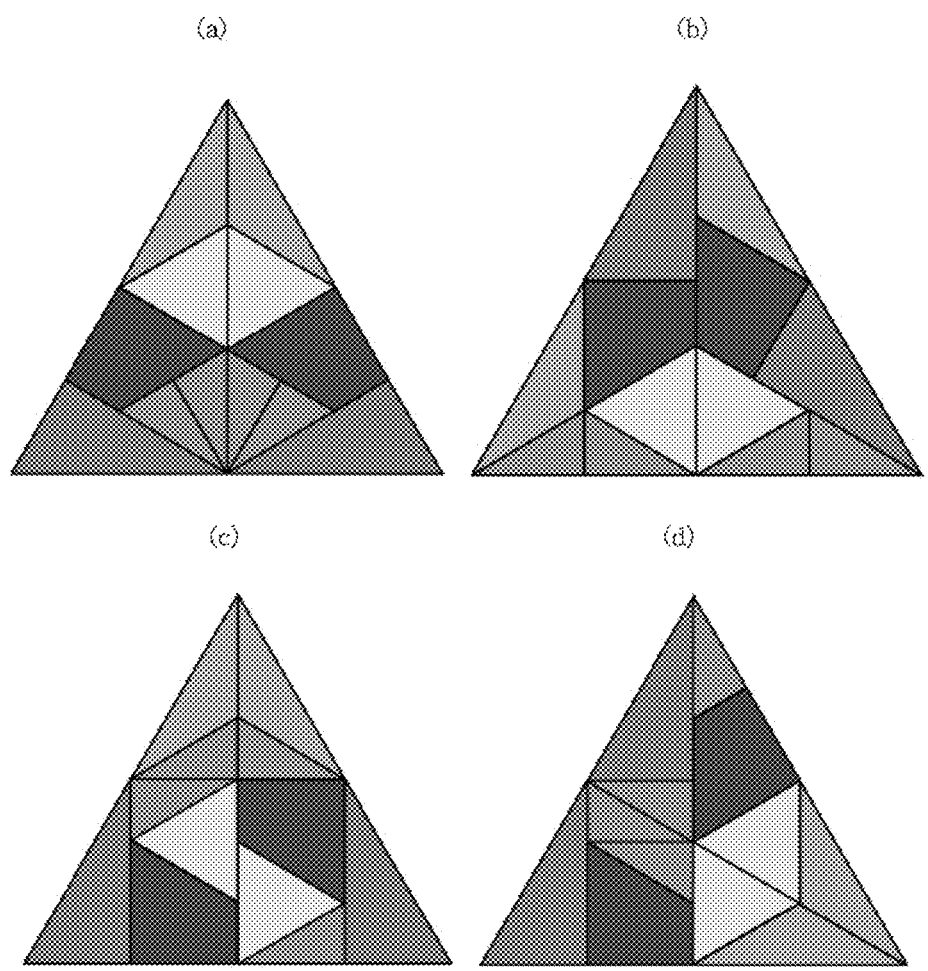

[Fig. 1 3]
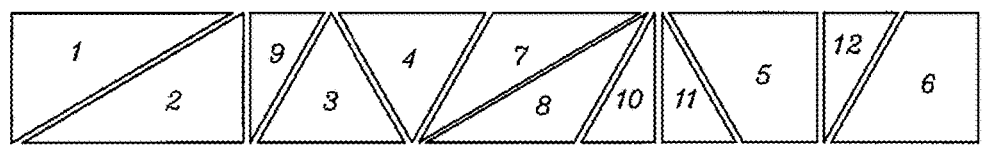
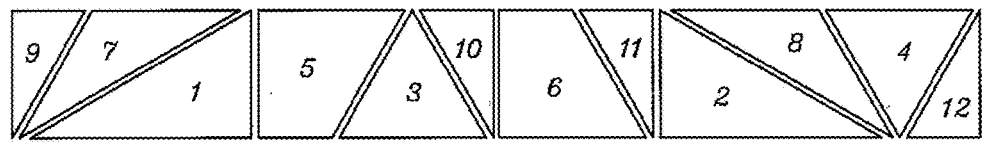
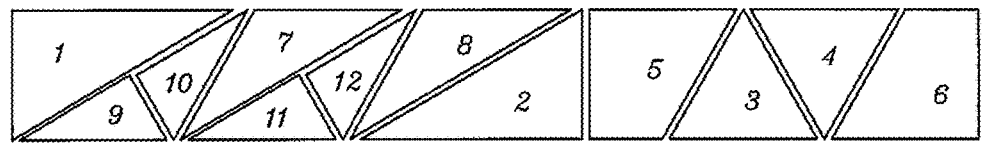

[Fig. 14]
(a)
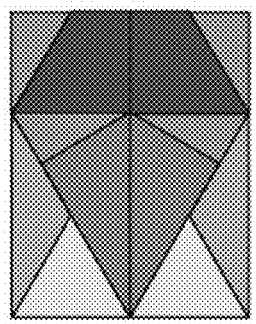
(b)
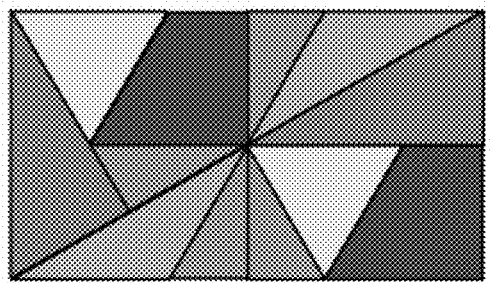
(c)
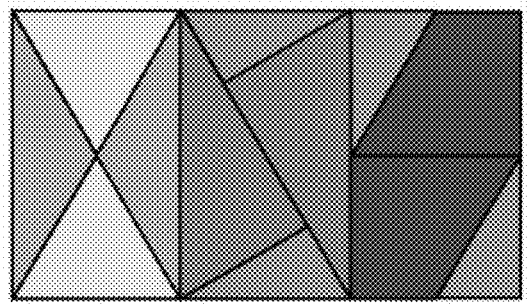
(d)
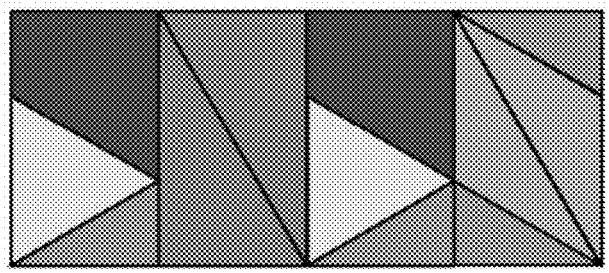
(e)
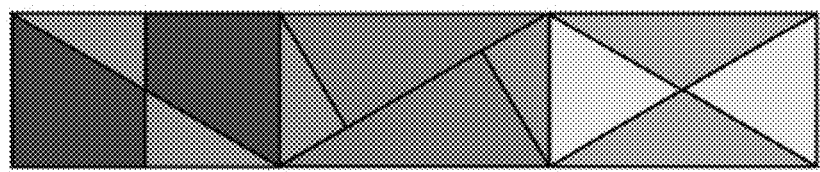

[Fig. 1 5]
(a)
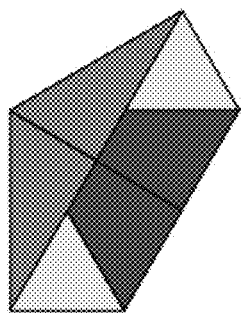 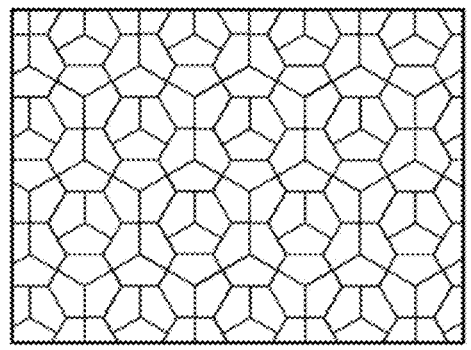
(b)
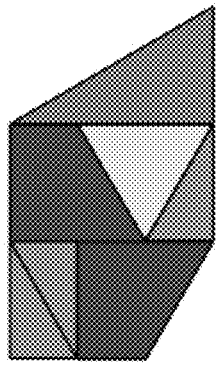 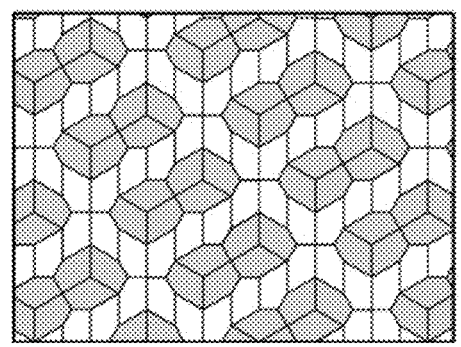
(c)
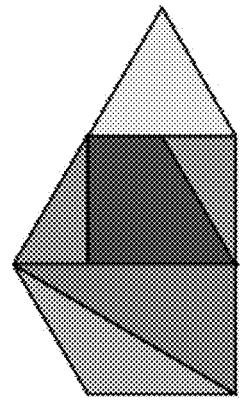 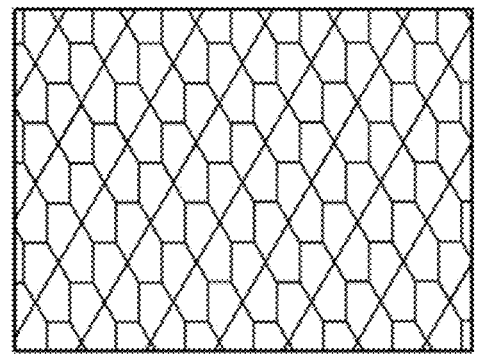

[Fig. 1 6]
(a)
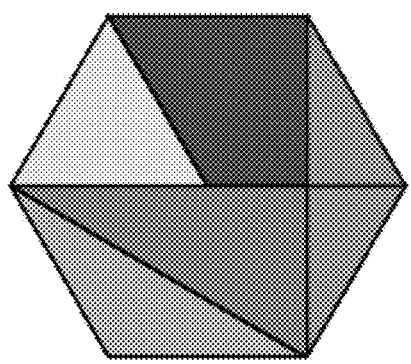
(b)
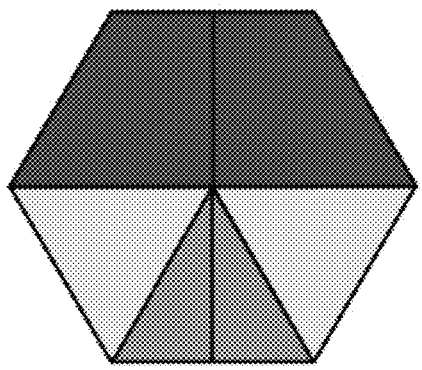
(c)
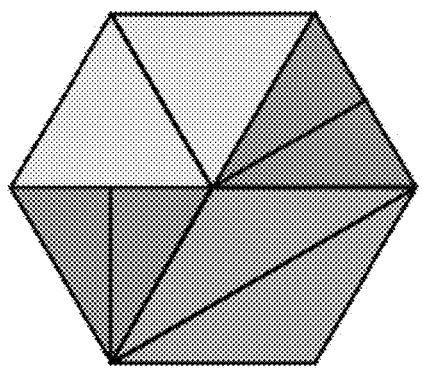
(d)
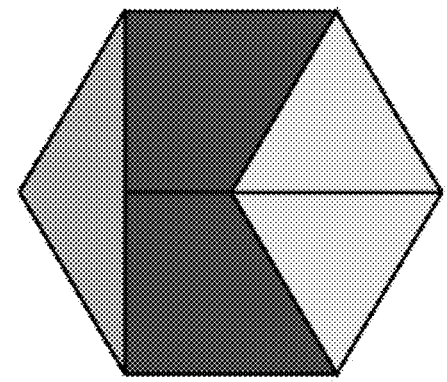
(e)
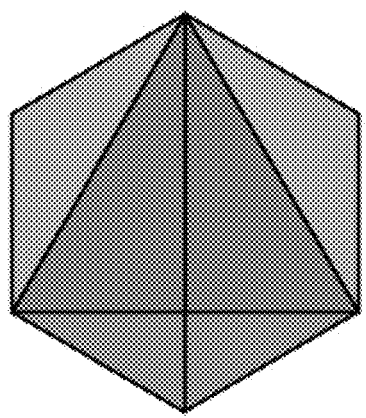

[Fig. 17]
(a)
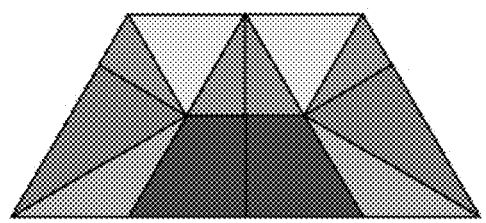
(b) (c)
 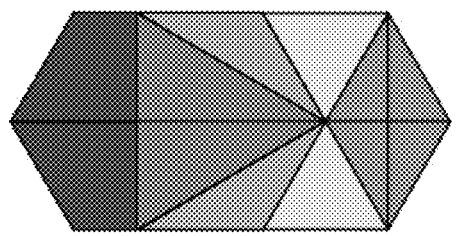
(d) (e)
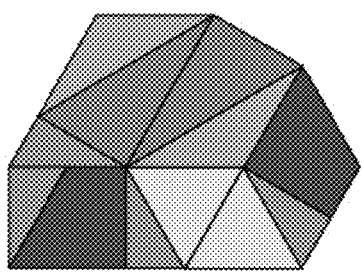 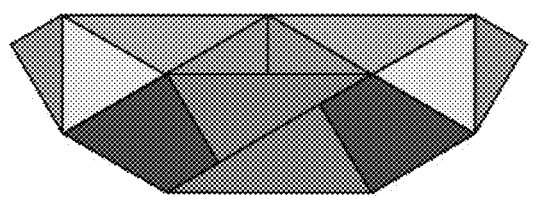

[Fig. 1 8]
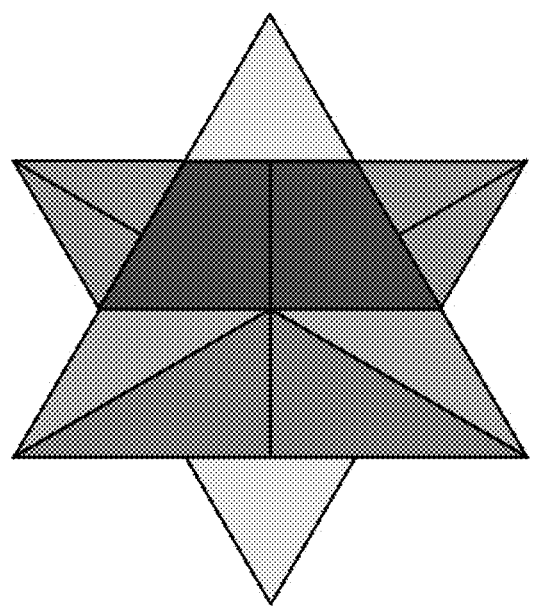

[Fig. 1 9]
(a)
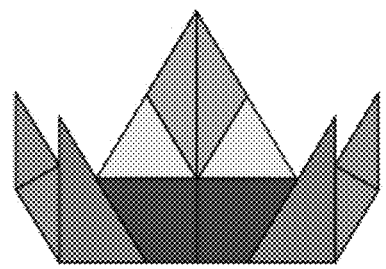
(b)
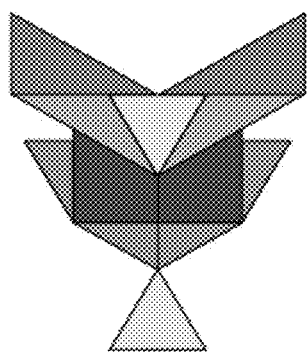
(c)
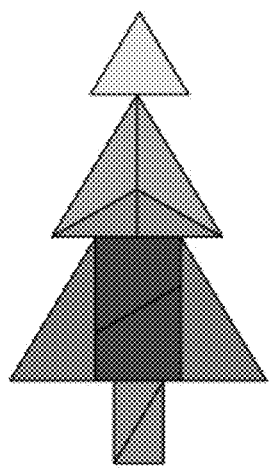

[Fig. 2 0]
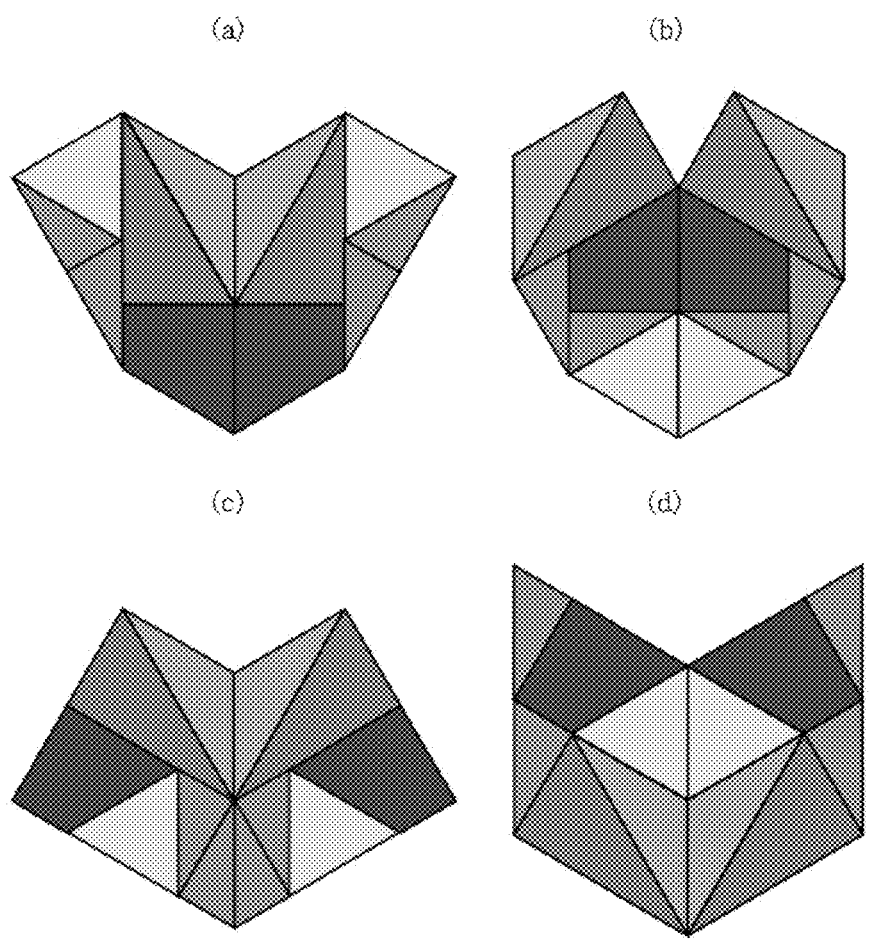

[Fig. 2 1]
(a) 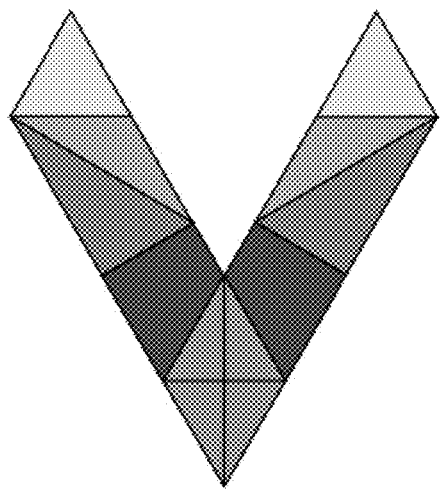  (b) 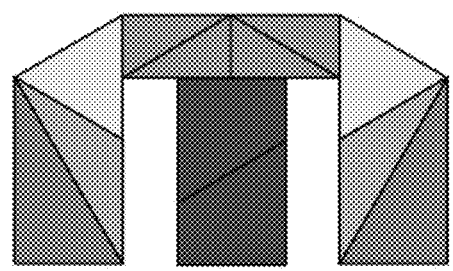
[Fig. 2 2]
(a) 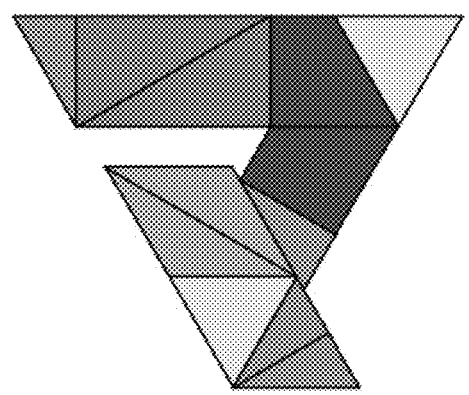  (b) 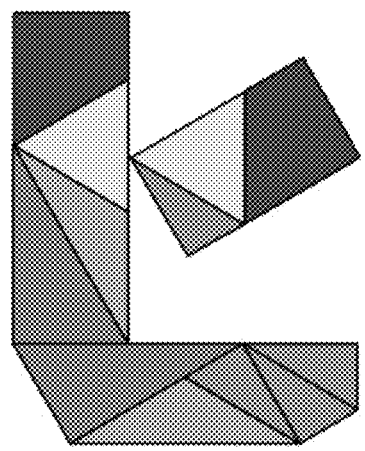

[Fig. 2 3]
(a) 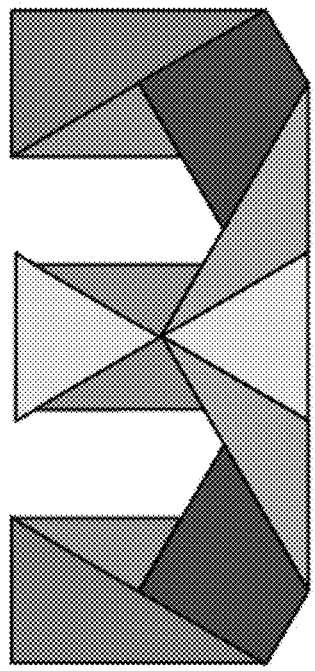   (b) 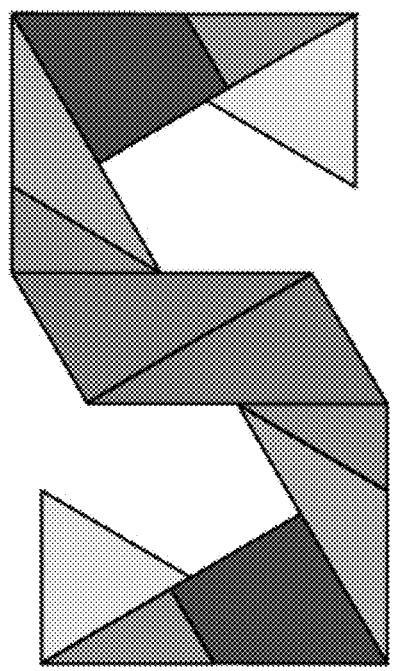

[Fig. 2 4]
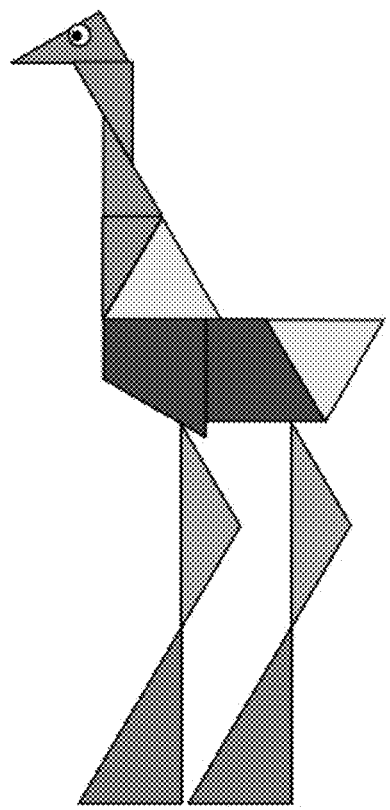
(a)
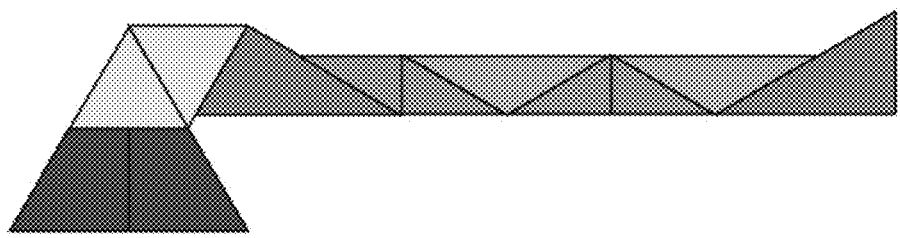
(b)

[Fig. 2 5]
(a)
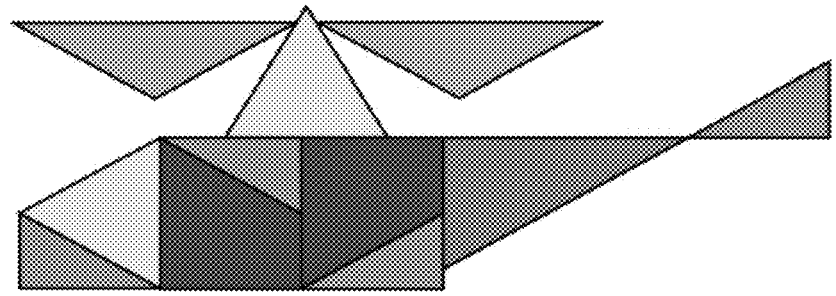
(b)
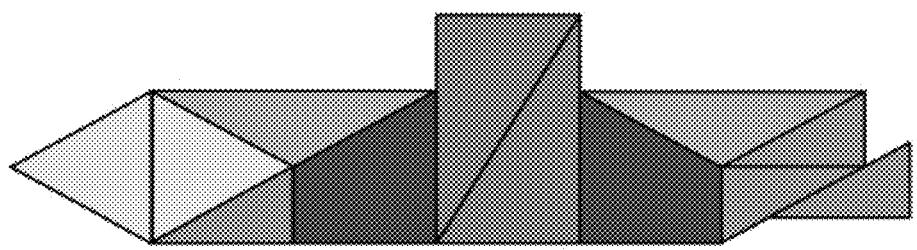
(c)
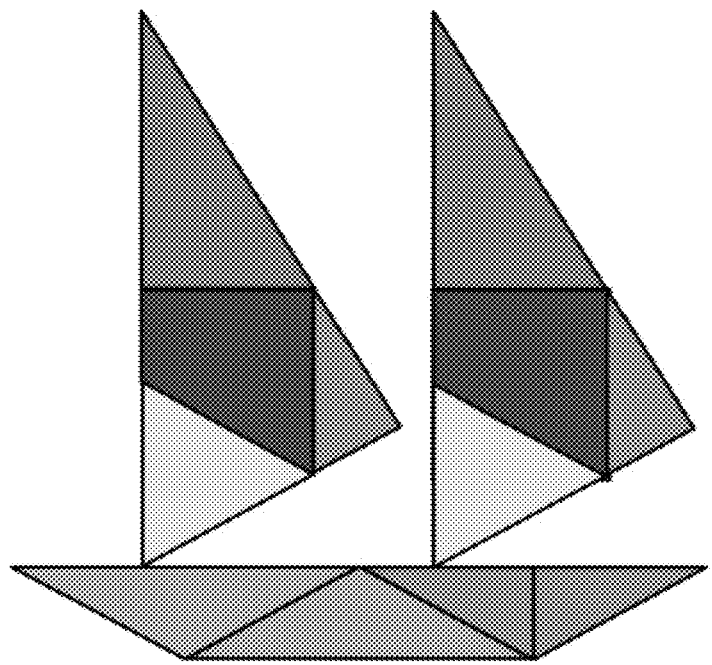

TWELVE-PIECE TANGRAM PUZZLE SET

CROSS REFERENCE TO RELATED APPLICATIONS

This application claims the benefit of priority from Korean Patent Application No. 10-2015-0039821 filed on Mar. 23, 2015, the contents of which are incorporated by reference.

BACKGROUND OF THE INVENTION

Field of the Invention

The present invention relates to a twelve-piece tangram puzzle set, and more particularly to a twelve-piece tangram puzzle set, which is a kind of figure puzzle that can overcome problems occurring in the existing seven-piece tangram puzzle and can minutely express shapes or patterns of various things, the twelve-piece tangram puzzle set being capable of allowing players to understand polygons, the equivalence relationship, similarity, or symmetry, which are covered in educational curricula, to develop their measurement abilities and to develop an aptitude with angles, thereby facilitating improvement of thinking ability for mathematics.

Description of the Related Art

A tangram puzzle set, which is a traditional puzzle toy, has been known to have originated in China before the birth of Christ and has been widely used by adults as well as children. The tangram puzzle set is composed seven pieces made by dissecting an equilateral triangle and is able to make the shapes of various figures, signs, letters, things, or the like by newly combining the seven pieces in various possible ways, whereby it has been known that the tangram puzzle set is effective in improving various intellectual abilities, such as the creativity, spatial relations, patience, and the like of children and to promote emotional development for children.

Korean Utility Model Laid-Open Publication No. 1998-58271, Korean Utility Model Laid-Open Publication No. 1999-41201, Korean Utility Model Laid-Open Publication No. 1999-34705 and the like disclose a tangram puzzle set. However, in spite of the fact that the conventional tangram puzzle set is composed of seven pieces, in particular five large and small isosceles right triangles, one equilateral triangle, and one parallelogram, and is able to make various figures by joining the pieces in all possible ways, it is problematic in that it is difficult for the shapes made by the pieces to express all things in modern society. In addition, since only figures in the form of old items or natural objects can be realized by the tangram puzzle set, it is disadvantageous in that the tangram puzzle set is not interesting to children. Further, it is disadvantageous in that the shapes made by the seven pieces are very abstract and unclear, and there are not many shapes that can be expressed by children because it is impossible to express relatively complicated shapes, namely, flower petals, four-legged animals such as dinosaurs, and the like.

In consideration of this fact, the applicant has developed a ten-piece tangram puzzle set disclosed in Korean Utility Model No. 20-218939 so that children can play with the tangram puzzle set in schools and educational settings. Thus, the applicant was able to confirm that the ten-piece tangram puzzle set is effective in extending the range of shapes that can be expressed thereby, and to improve creativity, spatial relations, the ability to associate idea, mathematical thinking ability, and the like of children while being more stimulating than the conventional seven-piece tangram puzzle set.

In addition, by further improving the tangram puzzle set, the applicant has suggested the twelve-piece tangram puzzle set disclosed in Korean Patent No. 10-0475483.

Korean Patent No. 10-0475483 is characterized in that an equilateral triangle having a certain size is divided into two equal parts by a diagonal line so that a basic frame having the overall shape of an equilateral triangle is formed as a tangram puzzle set; each of right-angled triangles on opposing sides is divided into two equal parts by second cutting lines that form right angles at one corner; the divided figures are divided by a third cutting line intersecting a diagonal line at right angles so as to is consistent with sides to which the second cutting lines reach; the resultant figures are divided by fourth horizontal and vertical cutting lines to meet an intersection point of the diagonal line and the third cutting line, thereby producing twelve small figures so that the figures having the same shapes are symmetrically arranged relative to each other based on the diagonal line.

In the case of the prior art, the basic frame with the equilateral triangle shape is set as a basic structure so that the equilateral triangle is divided based on a diagonal line that forms isosceles triangles. It has been found that it is difficult to express minute shapes through this division structure.

In addition, it has been also found that when the pieces of the ten-piece tangram puzzle set are combined, it is impossible to express shapes with a regular triangle.

PRIOR ART DOCUMENT

Patent Document

Korean Utility Model Laid-Open Publication No. 1998-58271
Korean Utility Model Laid-Open Publication No. 1999-41201
Korean Utility Model Laid-Open Publication No. 1999-34705
Korean Utility Model No. 20-218939
Korean Patent No. 10-0475483

SUMMARY OF THE INVENTION

Therefore, the present invention has been made in view of the above problems, and it is an object of the present invention to provide a twelve-piece tangram puzzle set, which can relatively minutely express the shapes of desired objects using pieces obtained by setting an equilateral triangle as a basic frame, by overcoming the disadvantages occurring in the existing seven-piece tangram puzzle set and a twelve-piece tangram puzzle set having an equilateral triangle as a basic frame.

It is another object of the present invention to provide a twelve-piece tangram puzzle set that can teach children the concepts of shapes through the twelve-piece tangram puzzle, and can also improve expressiveness for various things' images, the twelve-piece tangram puzzle set being capable of: creating various figures including triangles, quadrangles, trapezoids, parallelograms, pentagons, hexagons, heptagons, and octagons, together with rectangular shapes with relatively long lengths that are not implemented in the existing seven-piece or twelve-piece tangram puzzle set; easily expressing animals having long wings, tails or legs; minutely expressing various natural objects or artifacts;

creating various expressions with one object; expressing letters or figures; and easily expressing the shapes of symmetrical things.

In accordance with the present invention, the above and other objects can be accomplished by the provision of a twelve-piece tangram puzzle set, including: twelve pieces composed of five triangles (1, 3, 7, 9, 11), one trapezoidal quadrangle (5), five triangles (2, 4, 8, 10, 12), and one trapezoidal quadrangle (6) and arranged to be symmetrical to each other or joined in various other ways;

wherein the twelve pieces are formed in such a manner that: an equilateral triangle having a predetermined size is bisected into right-angled triangles (ΔABA1, ΔACA1) by a first cutting line (L1A) that divides both sides as equal parts at an equal angle of 30° based on any one (A) of vertices (A, B, C) of the equilateral triangle, and vertically cuts the equilateral triangle up to a point of a side corresponding to the vertex (A), thereby obtaining right-angled triangles (ΔABA1, ΔACA1);

each of the right-angled triangles (ΔABA1, ΔACA1) is divided in a following order:

being first divided by a second cutting line (L2C1, L2B1) at a right angle with respect to a hypotenuse (segment AB, segment AC) of each of the right-angled triangles (ΔABA1, ΔACA1) based on a point (C1, B1) bisecting the hypotenuse (segment AB, segment AC);

being then divided by a horizontal cutting line (C12, B12) so as to be cut horizontally in an inward direction of each of the right-angled triangles (ΔABA1, ΔACA1) based on the point (C1, B1) of the second cutting line (L2C1, L2B1);

being then divided by a vertical cutting line (C13, B13) so as to be cut vertically in the inward direction of each of the right-angled triangles (ΔABA1, ΔACA1) based on the point (C1, B1) of the second cutting line (L2C1, L2B1);

and being then divided by an equiangular cutting line (L3, L4) for bisecting an internal angle (∠ABA1) from a vertex (B, C) of each of the right-angled triangles (ΔABA1, ΔACA1) into equal angles, so that the five triangles (1, 3, 7, 9, 11) and one trapezoidal quadrangle (5), and the five triangles (2, 4, 8, 10, 12) and one trapezoidal quadrangle (6) are arranged to be symmetrical to each other at right and left sides based on the first cutting line (L1A).

According to the present invention, the twelve-piece tangram puzzle set can overcome the disadvantages occurring in the existing seven-piece tangram puzzle set or the recently developed twelve-piece tangram puzzle set and can relatively minutely express desired shapes using respective pieces constituting the twelve-piece tangram puzzle set by forming an equilateral triangle as a basic frame, whereby it is effective in increasing the creativity with which various shapes, figures, and the like can be formed through the twelve tangram puzzle set.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other objects, features and other advantages of the present invention will be more clearly understood from the following detailed description taken in conjunction with the accompanying drawings, in which:

FIG. 1 is a view showing the state in which an equilateral triangle for realizing the present invention is divided using a first cutting line;

FIG. 2 is a view showing the state in which the equilateral triangle is divided into right-angled triangles by the first cutting line shown in FIG. 1;

FIG. 3 is a view showing the state in which either of the divided right-angled triangles in FIG. 2 is divided into two pieces using a second cutting line;

FIG. 4 is a view showing the state in which the resultant figures in the state shown in FIG. 3 are divided into three pieces using a vertical cutting line;

FIG. 5 is a view showing the state in which the resultant figures in the state shown in FIG. 4 are divided into four pieces using a vertical cutting line;

FIG. 6 is a view showing the resultant figures in the state shown in FIG. 5, divided into six pieces using an equiangular cutting line;

FIG. 7 is a view showing the respective pieces obtained by performing cutting using the first cutting line, the second cutting line, the horizontal cutting line, the vertical cutting line, and the equiangular cutting line;

FIG. 8 is a view showing the state in which the respective pieces arranged in the right-angled triangles in the state shown in FIG. 6, obtained by the first cutting line, are symmetrical to each other;

FIG. 9 is a view indicating the angles of corners of the respective pieces obtained in FIG. 8;

FIG. 10 is a view showing the state in which the respective figures obtained from the present invention are arranged by being classified according to their shapes;

FIG. 11 is a view showing an example in which the pieces obtained from the present invention are disposed so as to be configured in a rectangle;

FIG. 12 is a view showing various equilateral triangles having other patterns that are implemented using the present invention;

FIG. 13 is a view showing three examples in which elongated rectangles are formed using the pieces;

FIG. 14 is a view showing rectangles that are formed in other patterns;

FIG. 15 is a view showing three types of pentagons that are formed using the pieces according to the present invention;

FIG. 16 is a view showing various patterns of regular hexagons that are formed using the pieces of the present invention;

FIG. 17 is a view showing a trapezoid, a parallelogram, a hexagon, a heptagon, and an octagon that are formed using the pieces of the present invention;

FIG. 18 is a view showing a star like that on the Israeli flag, formed using the pieces of the present invention;

FIG. 19 is a view showing a crown (a), a trophy (b), and a Christmas tree (c), which are things having bilateral symmetry, formed using the pieces of the present invention;

FIG. 20 is a view showing various heart shapes;

FIG. 21 is a view showing alphabetical characters;

FIG. 22 is a view showing katakana in Japanese language;

FIG. 23 is a view showing digits formed using the pieces;

FIG. 24 is a view showing an ostrich and an ax formed using the pieces; and

FIG. 25 is a view showing various kinds of transport means formed using the pieces.

DETAILED DESCRIPTION

The embodiments of the present invention will be hereinafter described in detail with reference to the accompanying drawings.

Terms or words used in the specification and the claims should not be restrictedly interpreted based on commonly used meanings or meanings defined in dictionaries and should be interpreted as having meanings or concepts which are consistent with the technical ideas of the present invention in light of the fact that inventors can appropriately define the concepts of terms for explaining their inventions in the best way. Accordingly, the embodiments described in the specification of the present invention and the elements illustrated in the drawings are only described as one example of the present invention and do not represent all technical ideas of the present invention. It should be understood that the embodiments of the present invention could be changed to a variety of equivalents and modified embodiments available at the time of filing the application for the present invention.

As shown in the accompanying drawings, an equilateral triangle is formed as a basic frame so that the equilateral triangle is divided by a first cutting line L1A, second cutting lines L2C1 and L2B1, horizontal cutting lines C12 and B12, vertical cutting lines C13 and B13, and equiangular cutting lines L3 and L4, thereby being divided into figures composed of 12 pieces, namely piece 1, piece 2, piece 3, piece 4, piece 5, piece 6, piece 7, piece 8, piece 9, piece 10, piece 11, and piece 12. Thus, triangles 1, 3, 7, 9 and 11, triangles 2, 4, 8, 10, and 12, quadrangle 5, which is a trapezoid, quadrangle 6, which is a trapezoid, that is, pieces 1 to 12 composed of the respective pieces are configured to be symmetrical to each other based on the first cutting line L1A.

In the following description of the present invention, the first cutting line L1A for enabling cutting based on a vertex A among vertices A, B, C is set as an overall reference line.

As illustrated in FIG. 1, when an equilateral triangle (ΔABC) is divided by the first cutting line L1A as a reference line, as shown in FIG. 2, two right-angled triangles (ΔABA1, ΔACA1) can be obtained.

In the following description, by selecting either (ΔABA1 or ΔACA1) of the two right-angled triangles (ΔABA1, ΔACA1), the selected right-angled triangle is sequentially cut to obtain the figures composed of the pieces. Since the same cutting process and order are applied to the two right-angled triangles (ΔABA1, ΔACA1), they will be described based on either (ΔABA1) of the two right-angled triangles.

In FIG. 2, the right-angled triangle (ΔABA1) is obtained by bisecting the equilateral triangle (ΔABC) of FIG. 1 with the first cutting line L1A. Then, based on a point C1 bisecting a hypotenuse (a segment AB) of the right-angled triangle (ΔABA1), the right-angled triangle (ΔABA1) is divided, as shown in FIG. 3, by the second cutting line L2C1 so as to be cut inwards at a right angle with respect to the hypotenuse (segment AB).

Meanwhile, as shown in FIG. 3, the figure cut by the second cutting line L2C1 is divided by the horizontal cutting line C12 so as to be cut horizontally in the inward direction of the right-angled triangle (ΔABA1) based on a point C1 bisecting the hypotenuse (segment AB) with the second cutting line.

As such, the right-angled triangle (ΔABA1), as shown in FIG. 4, is divided into three pieces by the horizontal cutting line C12.

Meanwhile, the figure in the state of FIG. 4 is divided again by the vertical cutting line C13, shown in FIG. 5 on the basis of the point C1.

As such, the right-angled triangle (ΔABA1) forms pieces divided into four pieces by the vertical cutting line C13.

Next, as illustrated in FIG. 6, the right-angled triangle (ΔABA1) divided into four pieces by the vertical cutting line C13 is divided by the equiangular cutting line L3 for bisecting an internal angle (∠ABA1) from a vertex B into equal angles.

As such, when the right-angled triangle (ΔABA1) is divided by the first cutting line L1A, the second cutting line L2C1, the horizontal cutting line C12, the vertical cutting line C13, and the equiangular cutting line L3, as shown in FIG. 8, pieces 1, 3, 5, 7, 9, and 11 can be obtained, wherein pieces 1, 3, 7, 9, and 11 are triangles, and piece 5 is a quadrangle.

Meanwhile, as described above, the original equilateral triangle (ΔABC) described above is bisected by the first cutting line L1A, whereby the right-angled triangle (ΔABA1) and the right-angled triangle (ΔACA1) can be obtained such that they are symmetrical to each other.

That is, as shown in FIG. 7, the right-angled triangle (ΔACA1) is divided inwards by the second cutting line L2B1 at a right angle with respect to the hypotenuse (segment AC) based on a point B1, which bisects a hypotenuse (segment AC) of the right-angled triangle (ΔACA1) in the same order as that used when cutting the right-angled triangle (ΔABA1). Based on the point B1 that bisects the second cutting line L2B1 and the hypotenuse (segment AC), the right-angled triangle(ΔACA1) is divided again by the horizontal cutting line(B12) to be divided horizontally in an inward direction and is then divided by the vertical cutting line B13 from the point B1.

Thus, as described above, the right-angled triangle (ΔACA1) divided into four pieces by the vertical cutting line B13 is divided by the equiangular cutting line L4 for bisecting an internal angle (∠ACA1) from a vertex C into equal angles. Thus, pieces 2, 4, 6, 8, 10, and 12 can be obtained, wherein pieces 2, 4, 8, 10, and 12 are triangles, and piece 6 is a quadrangle.

That is, the pieces, which are symmetrical to each other, can be obtained by cutting the right-angled triangles (ΔABA1, ΔACA1) using the cutting lines L2C1, L2B1, C12, B12, C13, B13, L3, and L4, wherein piece 1 is a triangle that is symmetrical to piece 2; piece 3 is a triangle that is symmetrical to piece 4; piece 5 is a quadrangle that is symmetrical to piece 6; piece 7 is a triangle that is symmetrical to piece 8; piece 9 is a triangle that is symmetrical to piece 10; and piece 11 is a triangle that is symmetrical to piece 12. Thus, a total of twelve puzzle pieces are obtained from the equilateral triangle (ΔABC), namely, triangular pieces (1, 2, 3, 4, 7, 8, 9, 10, 11, and 12) and 2 quadrangular pieces (5 and 6) are created.

The respective pieces obtained by cutting have constant internal angles, as illustrated in FIG. 9.

For example, pieces 1 and 2, pieces 9 and 10, and pieces 11 and 12 form right-angled triangle frames that are symmetrical to each other, thereby forming respective internal angles of 30°, 60°, and 90°.

Moreover, pieces 3 and 4 are equilateral triangles which are symmetrical to each other, each having an internal angle of 60°.

Furthermore, pieces 7 and 8 are obtuse-angled isosceles triangles with an obtuse angle in which the left or right internal angle of a bottom side is 30°, and the corresponding remaining internal angle is 120°, the isosceles triangles being symmetrical to each other.

Meanwhile, each of pieces 5 and 6 has a quadrangular shape with a trapezoid, and in the quadrangular shape, segments are formed in a vertical line while forming right angles from left and right end points of the bottom side such that the length of one of the segments is relatively short. Thus, the angle of one corner is 60°, and the angle of another corner is 120°.

FIG. 10 is a view showing the state in which the respective pieces obtained from the tangram puzzle set according to the present invention are arranged by being classified according to their shapes.

As shown in FIG. 10, the pieces obtained by the tangram puzzle set according to the present invention are four small right-angled triangles (9, 10, 11, and 12), two large right-angled triangles (1 and 2), two equilateral triangles (3 and 4), two obtuse-angled isosceles triangles (7 and 8), and two trapezoidal quadrangles (5 and 6).

The right-angled triangles of pieces 10 and 12, which are symmetrical to the right-angled triangles of pieces 9 and 11, have the same area.

Moreover, each of pieces 1 and 2, which form the right-angled triangular frame, has a relatively larger area than the respective areas of pieces 9, 11, 10, and 12, which are four right-angled triangles.

In addition, when pieces 1 and 2 (or 11) are combined with each other, a right-angled triangle is formed, and when pieces 3 and 7 are combined with each other, a right-angled triangle is also formed. Also, when pieces 5 and 11 (or 9) are combined with each other, a right-angled triangle is formed. The right-angled triangles obtained as described above have the same size and area.

With regard to the pieces that are symmetrical to the above-mentioned pieces, a right-angled triangle resulting from joining pieces 2 and 10 (or 12), a right-angled triangle resulting from joining pieces 4 and 8, and a right-angled triangle resulting from joining pieces 6 and 12 have the same size and area.

FIG. 11 shows that a rectangle is formed by re-arranging the pieces of the twelve-piece tangram puzzle set. The rectangle illustrated in FIG. 11 shows that the respective pieces constituting the rectangle are arranged to be symmetrical vertically based on a vertical line in the middle of the rectangle.

As shown in FIGS. 9 and 11, the twelve-piece tangram puzzle set according to the present invention shows that the equilateral triangle is perfectly replaced with the rectangle. Further, since changes to the overall appearance can be easily understood according to the arrangement of the figures constituting the equilateral triangle and the rectangle, the twelve-piece tangram puzzle set is advantageous in that the concepts of figures and the principle for calculation of the areas of figures can be naturally understood while playing with the tangram puzzle set, rather than by teaching by rote.

As such, the figures obtained by the twelve-piece tangram puzzle set according to the present invention enable the completion of a more elaborate and creative twelve-piece tangram puzzle set that is composed of a total of twelve pieces, including ten triangles and two quadrangles.

Variously shaped geometric shapes or the shapes of various things may be embodied by combining, arranging and joining the figure pieces composed of the figure pieces with ten triangles and the figure pieces with two rectangles.

Meanwhile, a box for storing the respective pieces according to the present invention may be provided.

Moreover, the figure pieces for the twelve-piece tangram puzzle set of the present invention may collectively provide an improved color sense by varying colors of the figure pieces for the twelve-piece tangram puzzle set of the present invention.

Since the metaphysical shapes, representative shapes, etc. that can be created using the twelve-piece tangram puzzle set disclosed in the embodiments of the present invention are infinite, only some examples of various shapes that can be expressed using the twelve-piece tangram puzzle set are illustrated in the accompanying drawings of the present invention.

First, various expressions using a polygon will be described.

FIG. 12 shows various equilateral triangles constituted by other arrangements of the twelve-piece tangram puzzle set, wherein the pieces constituting the equilateral triangle may be arranged to be symmetrical vertically, as shown in (a), or may be arranged to be asymmetrical, as shown in (b), (c), and (d).

FIG. 13 shows three examples in which respective elongated rectangles are created using the pieces of the present invention. This shows that all pieces may be arranged in a row by setting one side of a small right-angled triangle as a reference width, thereby creating an elongated rectangle. Long rectangles having various patterns may have the same widths, and the arrangements of the pieces may be variously changed.

In addition, FIG. 14 shows rectangles with other patterns formed using the pieces of the present invention.

FIG. 15 shows three-types of pentagons created using the pieces of the present invention. The pentagons shown in (a), (b), and (c) of FIG. 15 are figures having unique shapes, and as can be seen from combination patterns on the respective right sides, bottoms, planes of the figures such as wall surfaces or the like may be fully filled.

FIG. 16 shows regular hexagons with various patterns created using the pieces of the present invention.

FIG. 17 shows a trapezoid, a parallelogram, a hexagon, a heptagon, and an octagon created using the pieces of the present invention, and 65 or more polygons including the polygons described above can be arranged using all the twelve pieces of the present invention. FIG. 18 shows a star like that on the Israeli flag created using the pieces.

FIG. 19 is a view showing a crown (a), a trophy (b), and a Christmas tree (c), which are things having bilateral symmetry, formed using the pieces of the present invention, and FIG. 20 shows various heart shapes created using the pieces of the present invention. This shows that although an object has one symbol or image, the object can be variously expressed according to creators' sensation or aptitude.

FIG. 21 shows alphabetical characters V shown in (a) of FIG. 21 and M shown in (b) of FIG. 21 created using the pieces, FIG. 22 shows katakana in Japanese language, ma shown in (a) of FIG. 22 and hi shown in (b) of FIG. 22 using the pieces, and FIG. 23 shows a digit 3 shown in (a) of FIG. 23 and a digit 5 shown in (b) of FIG. 23 created using the pieces. As such, it can be seen that letters in various countries can be freely expressed using the pieces.

In addition to the figures, letters, and digits described above, things including an ostrich, which is an animal having long legs, as shown in (a) of FIG. 24, an ax having a long handle as shown in (b) of FIG. 24, and the like can be minutely expressed. Further, various kinds of transport means including a helicopter as shown in (a) of FIG. 25, a submarine as shown in (b) of FIG. 25, a yacht as shown in (c) of FIG. 25, and the like may be minutely expressed with respective characteristics.

The respective shapes presented in the present invention are illustrated as examples. In particular, since the expressed things also form perfect shapes geometrically, it is effective in improving children's geometric analysis and expression abilities of things.

In addition, various shapes or patterns can be specifically and realistically expressed, and asymmetrical shapes and patterns, as well as things or shapes with symmetrical shapes may be also creatively, originatively, and realistically expressed. Further, metaphysical and geometrical shapes may be expressed and displayed according to creators' characteristics.

As described above, although the present invention has been described based on the embodiments and the drawings, the present invention should not be limited to the embodiments, and those skilled in the art to which the present invention pertains will appreciate that various modifications, additions and substitutions are possible, without departing from the scope and spirit of the invention as disclosed in the embodiments and the drawings.

Accordingly, the technical ideas of the present invention should be understood based on the accompanying claims, and it is obvious that all equivalents or equivalent modifications of the present invention fall within the scope of the technical ideas of the present invention.

What is claimed is:

1. A twelve-piece tangram puzzle set, comprising:
   twelve pieces composed of five triangles (1, 3, 7, 9, 11), a first trapezoidal quadrangle (5), five triangles (2, 4, 8, 10, 12), and a second trapezoidal quadrangle (6) and arranged to be symmetrical to each other;
   wherein the twelve pieces are formed in such a manner that: an equilateral triangle having a predetermined size is bisected into right-angled triangles (ΔABA1, ΔACA1) by a first cutting line (L1A) that divides both sides as equal parts at an equal angle of 30° based on any one (A) of vertices (A, B, C) of the equilateral triangle, and vertically cuts the equilateral triangle up to a point of a side corresponding to the vertex (A), thereby obtaining right-angled triangles (ΔABA1, ΔACA1);
   each of the right-angled triangles (ΔABA1, ΔACA1) is divided in a following order:
   being first divided by a second cutting line (L2C1, L2B1) at a right angle with respect to a hypotenuse (segment AB, segment AC) of each of the right-angled triangles (ΔABA1, ΔACA1) based on a point (C1, B1) bisecting the hypotenuse (segment AB, segment AC);
   being then divided by a horizontal cutting line (C12, B12) so as to be cut horizontally in an inward direction of each of the right-angled triangles (ΔABA1, ΔACA1) based on the point (C1, B1) of the second cutting line (L2C1, L2B1);
   being then divided by a vertical cutting line (C13, B13) so as to be cut vertically in the inward direction of each of the right-angled triangles (ΔABA1, ΔACA1) based on the point (C1, B1) of the second cutting line (L2C1, L2B1);
   and being then divided by an equiangular cutting line (L3, L4) for bisecting an internal angle (∠ABA1) from a vertex (B, C) of each of the right-angled triangles (ΔABA1, ΔACA1) into equal angles,
   so that the five triangles (1, 3, 7, 9, 11) and the first trapezoidal quadrangle (5), and the five triangles (2, 4, 8, 10, 12) and the second trapezoidal quadrangle (6) are arranged to be symmetrical to each other at right and left sides based on the first cutting line (L1A).

2. The twelve-piece tangram puzzle set according to claim 1, wherein the pieces (9, 10, 11, 12) are relatively small right-angled triangles, the pieces (1, 2) are right-angled triangles that are relatively larger than the pieces (9, 10, 11, 12), the pieces (3, 4) are equilateral triangles, and the pieces (7, 8) are obtuse-angled isosceles triangles.

3. The twelve-piece tangram puzzle set according to claim 2, wherein each of the pieces (7) and the pieces (8) is an obtuse-angled isosceles triangle in which left and right internal angles of a bottom side are 30°, and a remaining one internal angle corresponding thereto forms an obtuse angle of 120°,
   the pieces first trapezoidal quadrangle (5) and the pieces second trapezoidal quadrangle (6) have segments in a vertical line at right angles from left and right end points of a bottom side, wherein a length of one segment is relatively short so that one corner angle is 60° and another corner angle corresponding thereto is 120°.

4. The twelve-piece tangram puzzle set according to claim 1, wherein the pieces (9, 10, 11, 12) have the same area.

5. The twelve-piece tangram puzzle set according to claim 1, wherein the pieces (1,9), pieces (3, 7), and pieces (5, 11) form a right-angled triangle by being combined, the pieces (2,10), pieces, and pieces (6, 12), which are symmetrical to the pieces (1,9), pieces (3, 7), and pieces (5, 11), form a right-angled triangle by being combined, wherein the right-angled triangles resulting from the combinations have the same area and size.

* * * * *